United States Patent
Diaz-Jimenez et al.

(10) Patent No.: US 9,994,233 B2
(45) Date of Patent: *Jun. 12, 2018

(54) HANDS ACCELERATING CONTROL SYSTEM

(71) Applicant: Continental Automotive Systems, Inc., Auburn Hills, MI (US)

(72) Inventors: Ruben Alejandro Diaz-Jimenez, Guadalajara (MX); Armando Aharon Campos-Gomez, Tlajomulco de Zuniga (MX); Alejandra Enriquez-Perez, Zapopan (MX); Kevin Adonai Madrid-Lopez, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/091,160

(22) Filed: Apr. 5, 2016

(65) Prior Publication Data

US 2016/0214623 A1 Jul. 28, 2016

Related U.S. Application Data

(63) Continuation of application No. 14/502,514, filed on Sep. 30, 2014, now Pat. No. 9,315,197.

(51) Int. Cl.
*G06F 7/70* (2006.01)
*G06F 19/00* (2018.01)
(Continued)

(52) U.S. Cl.
CPC ............. *B60W 50/10* (2013.01); *B60K 26/02* (2013.01); *G06F 3/017* (2013.01); *G06F 3/0325* (2013.01);
(Continued)

(58) Field of Classification Search
CPC ................ G06F 3/04842; G06F 17/28; G06F 17/30557; G06F 2203/012; G06F 3/04883;
(Continued)

(56) References Cited

U.S. PATENT DOCUMENTS 4,414,537 A * 11/1983 Grimes ................. A61B 5/1114
341/20
5,670,987 A * 9/1997 Doi ......................... B25J 9/1692
345/156
(Continued)

FOREIGN PATENT DOCUMENTS

CN 101351764 A 1/2009
CN 101536494 A 9/2009
(Continued)

OTHER PUBLICATIONS

CN Office Action dated Aug. 1, 2017 in corresponding application CN 201510635301.6.

*Primary Examiner* — Jelani A Smith
*Assistant Examiner* — Luis A Martinez Borrero

(57) ABSTRACT

A touch vehicle control system having a gesture interface device with one or more touchless sensors that detect a position of a driver's appendage within a range of movement detected by the sensors. The touchless sensors send a signal to the controller that is indicative of the position of the driver's appendage within the range of movement which is then interpreted to be a vehicle command signal for a vehicle's mechanical system. Command signals include, but are not limited to acceleration, braking, parking brake, turn signals, etc.

16 Claims, 3 Drawing Sheets

(51) Int. Cl.
*B60W 50/10* (2012.01)
*G06F 3/01* (2006.01)
*G06F 3/03* (2006.01)
*B60K 26/02* (2006.01)

(52) U.S. Cl.
CPC .............. *B60K 2026/029* (2013.01); *B60K 2350/1052* (2013.01); *B60W 2420/42* (2013.01); *B60W 2540/10* (2013.01); *B60W 2540/12* (2013.01)

(58) Field of Classification Search
CPC ....... G06F 2203/04108; G06F 19/3462; G06F 19/3456; G06F 19/3481; G06F 3/165; B60R 16/0373; B60R 16/037; B60R 25/1004; B60W 2540/18; B60W 2540/30; B60W 2550/14; B60W 2750/40; B60W 30/143; B60W 2540/103; B60W 30/18; B60W 50/10; B60W 40/09
USPC ............. 701/1, 2, 36, 119, 57, 70, 117, 118; 382/106, 154, 165
See application file for complete search history.

(56) References Cited

U.S. PATENT DOCUMENTS

| | | | | |
|---|---|---|---|---|
| 6,002,808 A * | 12/1999 | Freeman | .................. | G06F 3/017 348/171 |
| 6,215,478 B1 * | 4/2001 | Yeh | .................. | G05G 9/047 345/163 |
| 6,681,031 B2 * | 1/2004 | Cohen | .................. | G07F 9/023 382/103 |
| 6,950,534 B2 * | 9/2005 | Cohen | .................. | G06F 3/017 382/103 |
| 7,498,956 B2 * | 3/2009 | Baier | .................. | G06F 3/014 341/20 |
| 7,598,942 B2 | 10/2009 | Underkoffler et al. | | |
| 7,908,939 B2 * | 3/2011 | Kim | .................. | G05G 1/30 74/512 |
| 7,970,514 B2 * | 6/2011 | Aeberhard | .......... | B60W 10/184 180/315 |
| 8,001,620 B2 * | 8/2011 | Merkle | .............. | A41D 19/0027 2/159 |
| 8,368,647 B2 * | 2/2013 | Lin | .................. | G06F 3/014 345/158 |
| 8,396,252 B2 * | 3/2013 | El Dokor | ................ | G06F 3/017 382/106 |
| 8,704,758 B1 * | 4/2014 | Figley | .................. | G06F 3/0383 345/156 |
| 9,020,697 B2 * | 4/2015 | Ricci | .................. | H04W 48/04 701/36 |
| 9,117,318 B2 * | 8/2015 | Ricci | .................. | H04W 48/04 |
| 9,207,860 B2 * | 12/2015 | Rydenhag | .......... | G06F 3/04883 |
| 9,298,286 B2 * | 3/2016 | Liao | .................. | G06F 3/014 |
| 9,315,197 B1 * | 4/2016 | Diaz-Jimenez | ....... | B60W 50/10 |
| 9,423,879 B2 * | 8/2016 | Chen | .................. | G06F 3/017 |
| 9,606,647 B1 * | 3/2017 | Spencer-Harper | ...... | G06F 3/041 |
| 2007/0164878 A1 * | 7/2007 | Baier | .................. | G06F 3/014 341/20 |
| 2009/0212979 A1 * | 8/2009 | Catchings | ............ | G06F 3/014 341/20 |
| 2009/0322680 A1 * | 12/2009 | Festa | .................. | G06F 3/014 345/160 |
| 2010/0053304 A1 * | 3/2010 | Underkoffler | .......... | G06F 3/017 348/42 |
| 2010/0060576 A1 * | 3/2010 | Underkoffler | .......... | G06F 3/017 345/158 |
| 2010/0066676 A1 * | 3/2010 | Kramer | .................. | G06F 3/017 345/158 |
| 2010/0077886 A1 * | 4/2010 | Seiltz | .................. | G05G 1/38 74/513 |
| 2010/0278393 A1 * | 11/2010 | Snook | .................. | G06F 3/011 382/107 |
| 2011/0029185 A1 * | 2/2011 | Aoki | .................. | B60K 37/06 701/31.4 |
| 2011/0242064 A1 * | 10/2011 | Ono | .................. | B60K 35/00 345/184 |
| 2011/0289455 A1 * | 11/2011 | Reville | .................. | G06F 3/011 715/830 |
| 2011/0289456 A1 * | 11/2011 | Reville | .................. | G06F 3/011 715/830 |
| 2011/0310005 A1 * | 12/2011 | Chen | .................. | G06F 1/3203 345/156 |
| 2012/0051588 A1 * | 3/2012 | McEldowney | ........ | G03B 17/54 382/103 |
| 2012/0223959 A1 * | 9/2012 | Lengeling | ............ | G06F 3/04883 345/619 |
| 2012/0265535 A1 * | 10/2012 | Bryant-Rich | ........ | H04M 1/7255 704/270 |
| 2012/0283894 A1 * | 11/2012 | Naboulsi | ............. | B60R 11/0264 701/1 |
| 2012/0320080 A1 * | 12/2012 | Giese | .................. | G06F 3/017 345/619 |
| 2013/0145360 A1 * | 6/2013 | Ricci | .................. | G06F 9/54 717/174 |
| 2013/0155237 A1 * | 6/2013 | Paek | .................. | G06F 1/1632 348/148 |
| 2013/0274983 A1 * | 10/2013 | Matsuda | ................ | B62K 11/04 701/22 |
| 2014/0109080 A1 * | 4/2014 | Ricci | .................. | G06F 8/61 717/174 |
| 2014/0160048 A1 * | 6/2014 | Conway | ................ | B60K 35/00 345/173 |
| 2014/0309879 A1 * | 10/2014 | Ricci | .................. | H04W 48/04 701/36 |
| 2014/0309886 A1 * | 10/2014 | Ricci | .................. | H04W 48/04 701/41 |
| 2014/0316670 A1 * | 10/2014 | Krauss | .................. | B60K 31/00 701/93 |
| 2015/0002391 A1 * | 1/2015 | Chen | .................. | G06F 3/017 345/156 |
| 2015/0078621 A1 * | 3/2015 | Choi | .................. | G09G 5/14 382/103 |
| 2015/0106007 A1 * | 4/2015 | Matsumura | ......... | B60W 30/143 701/408 |
| 2015/0149035 A1 * | 5/2015 | Enthaler | ................ | B60K 37/06 701/36 |
| 2015/0261350 A1 * | 9/2015 | Lee | .................. | G06F 3/044 345/174 |
| 2015/0267807 A1 * | 9/2015 | Tokumo | .................. | F16H 59/08 701/52 |
| 2016/0048205 A1 * | 2/2016 | Baier | .................. | G06F 3/014 345/156 |
| 2016/0090104 A1 * | 3/2016 | Diaz-Jimenez | ........ | B60W 50/10 701/70 |
| 2016/0091978 A1 * | 3/2016 | Park | .................. | G06F 3/017 345/156 |
| 2016/0098088 A1 * | 4/2016 | Park | .................. | G06K 9/00355 345/156 |
| 2016/0162037 A1 * | 6/2016 | Park | .................. | G06F 3/017 345/156 |
| 2016/0280224 A1 * | 9/2016 | Tatourian | ............ | B60W 30/143 |
| 2017/0124407 A1 * | 5/2017 | Micks | .................. | B60W 40/08 |

FOREIGN PATENT DOCUMENTS

| | | |
|---|---|---|
| CN | 102132227 A | 7/2011 |
| CN | 102270035 A | 12/2011 |
| CN | 103076877 A | 5/2013 |

* cited by examiner

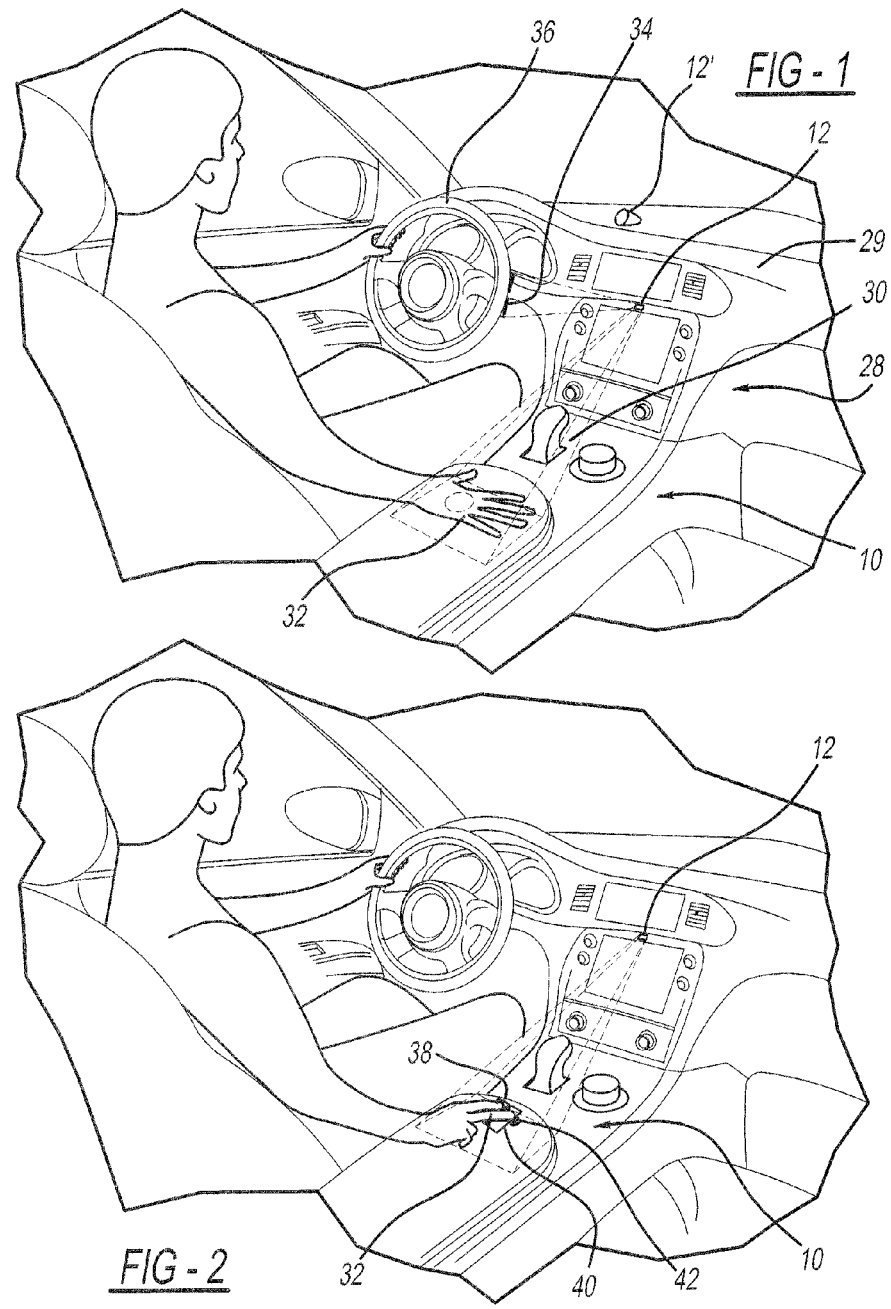

HANDS ACCELERATING CONTROL SYSTEM

CROSS-REFERENCE TO RELATED APPLICATIONS

This application is a continuation of U.S. application Ser. No. 14/502,514, filed on Sep. 30, 2014, which is incorporated by reference herein in its entirety.

FIELD OF THE INVENTION

The present invention relates to a touch free vehicle accelerator and braking control system.

BACKGROUND OF THE INVENTION

In current motor vehicles, the acceleration, braking, and other physical interactions with a vehicle, such as opening a vehicle hood, turning on and off turn signals, wipers, wiper mist features, headlights, and applying the parking brake all require the movement of several different components. In particular, a vehicle accelerating and braking system relies upon the use of a driver interface device commonly referred to as the accelerator pedal and brake pedal. All of the various individual components have different sensors and interfaces which add different components to the vehicle. In particular, the accelerator and brake pedals have sensors located at the foot of the driver and a driver must have a fully functioning foot and be positioned at an appropriate position relative to the pedals for them to operate properly. It is desirable to reduce the number of interfaces in a vehicle, but still provide the same number of mechanical features with relatively little modification of current vehicle designs. It is also desirable to provide a practical driver interface that does not necessarily require a driver to have fully functioning legs or fully functioning fingers.

SUMMARY OF THE INVENTION

The present invention relates to a touch free vehicle control system having a controller that is capable of controlling an accelerator and a brake of a vehicle. The controller may act directly in connection with the accelerator or braking mechanisms or may send signals to a vehicle control unit for subsequently operating the accelerator or brake. The touch free vehicle control system includes a gesture interface device having one or more touchless sensors that detect a position of a driver's appendage within a range of movement. The one or more touchless sensors operate without any physical touching between the one or more touchless sensors and the driver's appendage. The one or more touchless sensors send a signal to the controller that is indicative of the position of the driver's appendage within the range of movement.

In an alternate embodiment, the system is used in connection with foot or finger pedals that are spring loaded and capable of moving between two points to define a range of motion or a specific gesture. One pedal is interpreted to be an accelerator pedal and the second pedal is a gesture interpreted as a brake pedal. It is possible for the pedals to be interpreted as different gestures for different vehicle functions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is an illustrated view of a touch free vehicle control system and its operation within an interior of a vehicle;

FIG. 2 is an illustrated view of a touch free vehicle control system and its operation within an interior of a vehicle;

DETAILED DESCRIPTION OF THE PREFERRED EMBODIMENTS

The following description of the preferred embodiment(s) is merely exemplary in nature and is in no way intended to limit the invention, its application, or uses.

Figure 6:
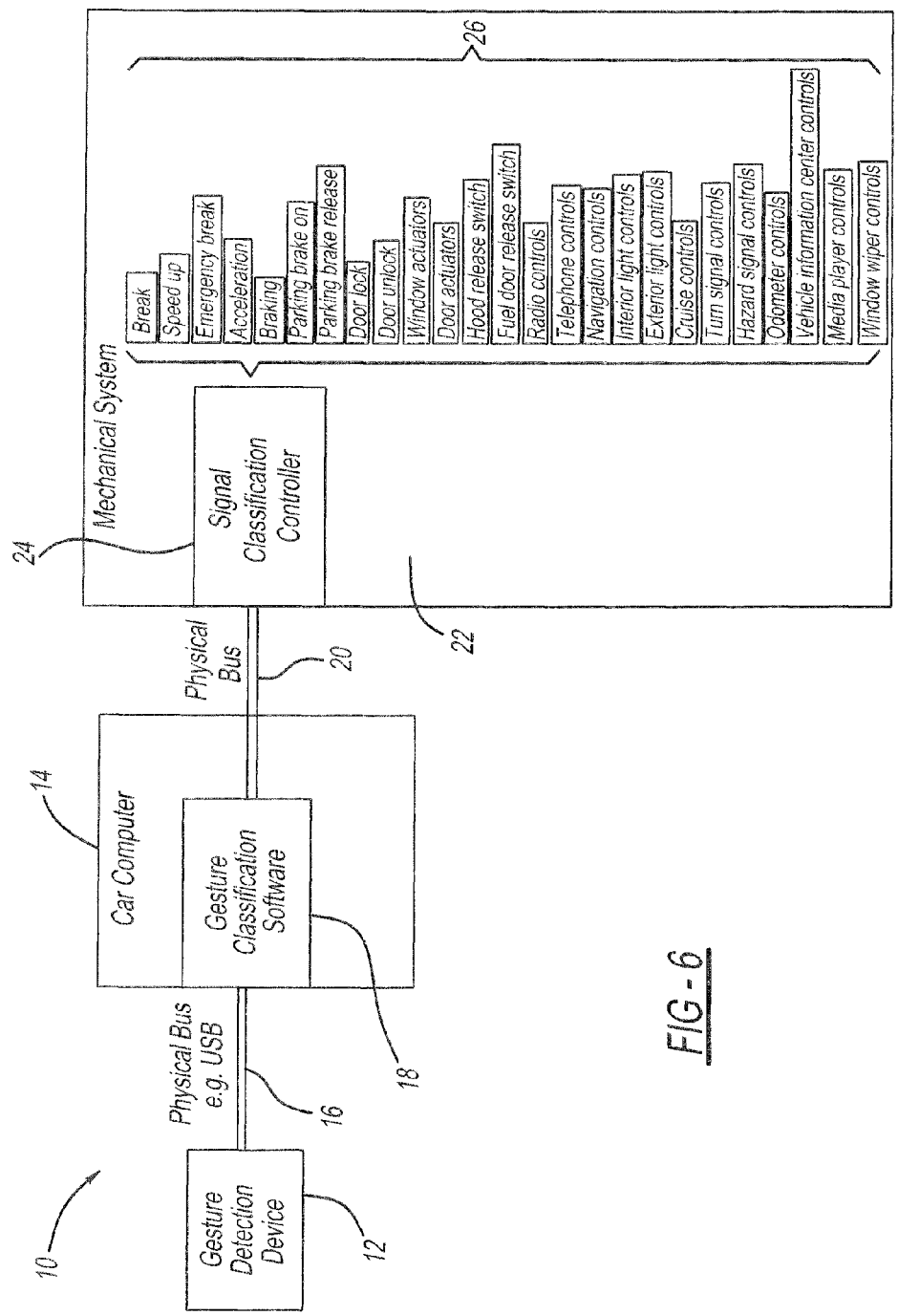
FIG. 6 is a schematic diagram showing the overall operation of the touch free vehicle control system.

Referring now to FIG. 6, a schematic diagram outlining the operation of a touch free vehicle control system 10, 100 is shown. The touch free vehicle control system 10, 100 includes a gesture detection device 12, 12', 112 that includes one or more touchless sensors. The gesture detection device 12, 12', 112 and one or more touchless sensors may include a combination of sensors and may particularly include a Leap Motion® device, charge couple device, infrared sensors, digital cameras, motion detectors, and combinations thereof. The gesture detection device 12 is physically connected to a controller 14, which may be a car computer, or a separate electronic control unit (ECU). The connection between the gesture detection device 12, 12', 112 and the controller 14 may be a first connection 16 such as a physical bus (e.g. universal serial bus (USB)) connection or the first connection 16 may be a wireless connection. The controller 14 includes gesture classification software 18 programmed thereon, which is capable of interpreting the signals generated by the gesture detection device 12, 12', 112.

The gesture for classification software 18 processes the signals from the gesture detection device 12 and then transmits a command signal through a second connection 20, which may be a physical or wireless bus where the signal is passed onto a mechanical system 22 of a vehicle. The mechanical system 22 of the vehicle may include a signal classification controller 24 that receives the command signals from the controller 14 and then sends or directs the command signal onto vehicle functions 26.

The vehicle functions 26 include, but are not limited to, acceleration, braking, parking brake on, parking brake release, door lock, door unlock, window actuators, door actuators, hood release switch, fuel door release switch, radio controls, telephone controls, navigation controls, interior light controls, exterior light controls, cruise controls, turn signal controls, hazard signal controls, odometer controls, vehicle information center controls, media player controls, and window wiper controls. The different vehicle functions 26 receive a signal from the signal classification controller 24, which is shown to be part of the mechanical system 22 of the vehicle; however, it is within the scope of this invention for the signal classification controller 24 to be part of the controller 14 and signals from the signal classification controller 24 will be sent directly from the controller 14 to the specific vehicle functions 26, thereby eliminating the need for the second connection 20 between the controller 14 and the signal classification controller 24.

Figure 3:
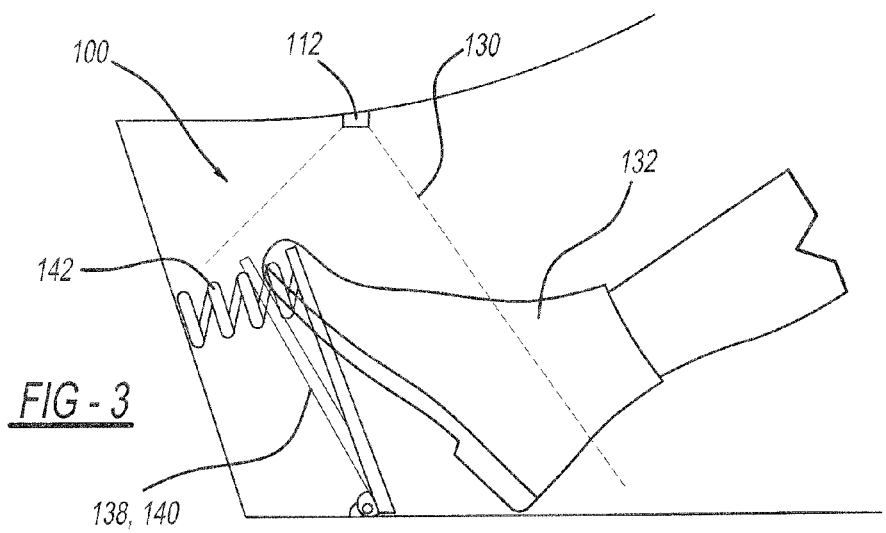
FIG. 3 is a side plan view of a touch free vehicle control system used in connection with a foot pedal.

Referring now to FIG. 1, an environmental view showing the touch free vehicle control system within an interior 28 cabin of a motor vehicle is shown. The gesture interface device 12 in this particular embodiment is connected to a vehicle instrument panel 29 and has a detection zone 30 which is an area where the gesture interface device 12 may detect gestures from an appendage 32 of a driver. The appendage 32 as shown in FIG. 1 is the driver's hand, but may be other appendages such as the driver's fingers as shown in FIG. 2, or the driver's foot as shown in FIG. 3. It is also possible for the detection zone to be moved or changed to detect movements at other locations. FIG. 1 shows an alternate location having pedals 34 located on a steering wheel 36 where the pedals 34 would operate in a manner similar to the pedals shown in FIGS. 2-4, which will be described later.

Another alternate embodiment shown in FIG. 1 includes a gesture interface device that is a microphone for receiving audio signals. The microphone 12' can be used to receive audio gestures instead of movements of a driver's appendage. The microphone 12' can be used in connection with the movement oriented gesture interface device 12 or may be used independently.

As shown in FIG. 1, the driver's appendage 32 is placed within the detection zone 30 and different gestures or movements may be made in order to define a specific command. For example, as shown in FIG. 1, the driver's appendage 32 is a flat hand which may indicate a brake command, an acceleration command or some other type of command. The detection zone 30 also defines a range of movement for a specific gesture.

For example, if the driver's appendage 32 is a flat hand indicating stop or braking a clenched fist or a position between a flat hand and a clenched fist, then the range of motion between a fully clenched fist and a flat hand could be interpreted by the gesture interface device 12 to be a command to accelerate the vehicle. The position of the driver's fingers between a flat hand and a clenched fist will be interpreted by the gesture interface device 12 to be the degree of acceleration from a full brake position (e.g. a flat hand) and a fully accelerated position (e.g. a clenched fist).

Referring now to FIG. 2, an alternate embodiment of the invention is shown where the touch free vehicle control system 10 utilizes two finger pedals 38, 40. The two finger pedals 38, 40 may, for example, be interpreted by the gesture interface device 12 to be a brake pedal 38 and accelerator pedal 40. It is within the scope of this invention for additional pedals to be used, or for the one or more pedals 38, 40 to be interpreted by the gesture interface device to be a different type of pedal for generating the various vehicle functions 26 as shown in FIG. 6. The one or more pedals 38, 40 may pivot and have a spring 42 located under the pedals for providing resistance in order to give the driver a more resistant feel when depressing each of the one or more pedals 38, 40. The pedals 38, 40 define the range of motion for the gesture interface device. The gesture interface device 12 in actuality is detecting the movement of the driver's appendage 32 and not necessarily the movement of the pedals 38, 40. Instead, the pedals 38, 40 are present in order to assist the driver in making the proper gestures for the gesture interface device 12 and for providing the driver with a feel of where the driver's appendage 32 is within the range of movement detected by the gesture interface device 12.

Referring now to FIG. 3, an alternate embodiment of a touch free vehicle control system 100 is shown. In this particular embodiment, the touch free vehicle control system 100 is installed near a driver's appendage 132 which is the driver's foot. The one or more pedals 138, 140 are foot pedals that have a spring 142 connected to the underside of the foot pedal in order to provide the driver with a resistance type feel in order to give the driver a similar feel for where his or her appendage 132 is located within a detection zone 130 of a gesture interface device 112. The gesture interface device 112 detects the position of the driver's appendage 132 within the range of movement in a manner similar to the finger pedals 38, 40 shown in FIG. 2.

The touch free vehicle control system 100 shown in the present embodiment of the invention provides an alternate arrangement to traditional vehicle accelerator and brake pedal systems that detect the movement of the pedal using sensors or mechanical connections such as a cable with the accelerator and brake components of a vehicle. The touch free vehicle control system 100 in the present embodiment of the invention eliminates a number of different components by removing the physical wiring and sensors that would traditionally be connected to the vehicle accelerator pedal and brake pedal. This reduces the number of components and also reduces physical wear that would occur with traditional sensors located on the accelerator and brake pedal. The touch free vehicle control system 100 as shown in FIG. 3 senses the position of the driver's appendage 132 or foot and is not detecting the position of the one or more pedals 138, 140.

Figure 4:
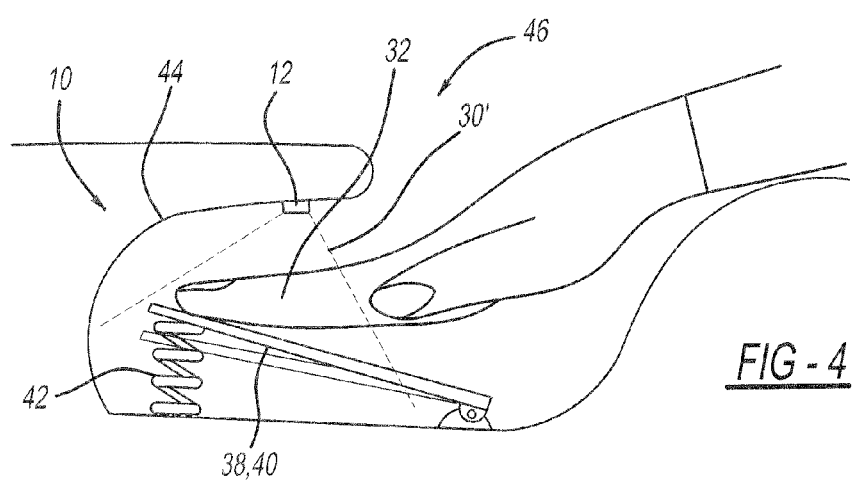
FIG. 4 is a side plan view of a touch free vehicle control system used in connection with a hand pedal.

FIG. 4 shows an alternate embodiment of the invention shown in FIG. 2. In the present embodiment of the invention, the gesture interface device 12 is located within a well 44 having an aperture 46. The well 44 may be formed in a surface of the vehicle interior cabin 28 to allow a user to place their appendage 32 through the aperture 46 into the well, which defines a detection zone 30'. The detection zone 30' is thereby contained within the well 44, which provides the advantage of eliminating the possibility of accidental movements within the detection zone 30'. FIG. 4 also optionally includes finger pedals 38, 40 which have springs 42 for providing resistance and allowing the users appendage to interact with and depress the finger pedals 38, 40. The purpose of providing the finger pedals 38, 40 is the same as the embodiment shown in FIG. 2, thereby providing the user with a feel for where their appendage 32 is within the range of motion of the detection zone 30'.

Figure 5:
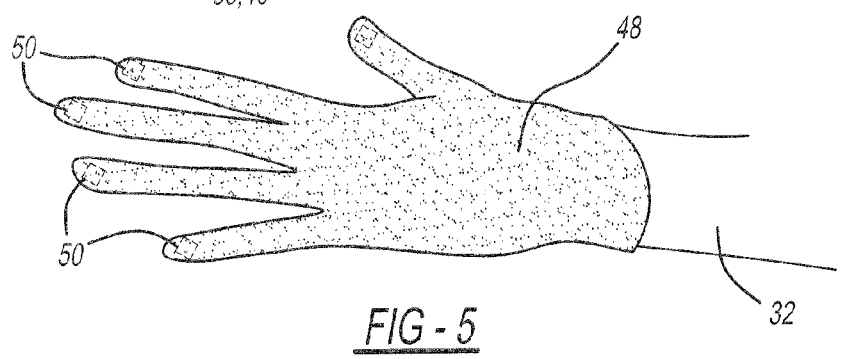
FIG. 5 is an overhead plan view of a glove on a user's hand used in connection with the touch free vehicle control system in accordance with one embodiment of the present invention.

Referring now to both FIG. 4 and FIG. 5, additional alternate embodiments are shown where the user's appendage 32 is a hand that has a glove 48 on the appendage 32. The glove 48 has detection points 50 located at the tips of the fingers, which are detected by the gesture interface device 12. This embodiment allows for only a person wearing the glove 48 to operate the touch free vehicle control system 10 since the gesture interface device 12 will only detect movements of the detection points 50 of the person wearing the glove 48. FIG. 4 shows an additional alternate embodiment where the person wearing the glove 48 will still place their hand through the aperture 46 of the well 44 in order to operate the touch free vehicle control system. The use of a glove 48 with detection points 50 will prevent accidental operation of the touch free vehicle control system 10, but also may provide more precise movements or gestures to be read by the gesture interface device 12 since the exact dimensions of the glove 48 and location of the detection points 50 are known. The use of the glove 48 a shown in FIG. 4 is optional and not required.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A touch free vehicle control system comprising:
a controller capable of controlling acceleration and braking of a vehicle; and
an interface device having at least one touchless sensor configured to detect a plurality of gestures and a plurality of positions of at least one appendage of a driver within a range of movement without any physical touching between the at least one touchless sensor and the at least one appendage, wherein the at least one touchless sensor is configured to send a command signal to the controller that is indicative of at least one of the plurality of gestures and the plurality of positions of the appendage within the range of movement, wherein different movements of the appendage cause the controller to generate different command signals from the controller; and
a plurality of spring-loaded finger pedals positioned at a location relative to the at least one touchless sensor allowing the at least one touchless sensor to send a signal to the controller that is indicative of the position the at least one appendage, wherein a first finger pedal of the plurality of finger pedals is configured to be interpreted by the controller to be one of the plurality of gestures and defines a first range of movement for an accelerator pedal, and wherein a second finger pedal of the plurality of finger pedals is configured to be interpreted by the controller to be another of the plurality of gestures and defines a second range of movement for a brake pedal, wherein depressing the first finger pedal causes the controller to cause acceleration of the vehicle and depressing the second finger pedal causes the controller to cause braking of the vehicle based on the position of the at least one appendage in the range of movement, wherein the position of the at least one appendage within the range of movement controls at least one of a magnitude of acceleration and a magnitude of braking.

2. The touch free vehicle control system of claim 1, wherein the at least one touchless sensor is a plurality of touchless sensors that comprises a plurality of cameras.

3. The touch free vehicle control system of claim 2, wherein the plurality of touchless sensors comprises a plurality of infrared sensors.

4. The touch free vehicle control system of claim 3, wherein the controller is configured to cause acceleration and braking of the vehicle based solely on the position of the at least one appendage in the range of movement.

5. The touch free vehicle control system of claim 4, wherein the gesture interface device further includes an enclosed well containing the plurality of touchless sensors and the first and second finger pedals, the enclosed well defining an aperture configured to allow the driver to place the at least one appendage within the enclosed well to access the first and second finger pedals to prevent accidental movement in the area of the plurality of touchless sensors.

6. The touch free vehicle control system of claim 4, wherein the gesture interface device further includes an enclosed well containing the plurality of touchless sensors, the enclosed well defining an aperture configured to allow the driver to place the at least one appendage within the enclosed well so that movement of the at least one appendage is detected by the plurality of touchless sensors and accidental movement in the range of movement is prevented.

7. The touch free vehicle control system of claim 4, wherein the different command signals generated from the controller include signals operating a vehicle function selected from the group consisting of:
acceleration, braking, parking brake on, parking brake release, door lock, door unlock, window actuators, door actuators, hood release switch, fuel door release switch, radio controls, telephone controls, navigation controls, interior light controls, exterior light controls, cruise controls, turn signal controls, hazard signal controls, odometer controls, vehicle information center controls, media player controls and window wiper controls and combinations thereof.

8. The touch free vehicle control system of claim 4, wherein the plurality of touchless sensors comprises at least one of a charge coupled device and a motion detector.

9. A touch free vehicle control system comprising:
a controller capable of controlling acceleration and braking of a vehicle; and
a gesture interface device having a plurality of touchless sensors, the plurality of touchless sensors comprising at least one of the following: a charge coupled device, infrared sensors, digital cameras, and motion detectors, the plurality of touchless sensors being configured to directly detect a gesture and a position of a driver's appendage within a range of movement without any physical touching between the plurality of touchless sensors and the driver's appendage, the plurality of touchless sensors being configured to send a command signal to the controller that is indicative of the gesture and the position of the driver's appendage within the range of movement, wherein different movements of the driver's appendage cause the controller to generate different command signals from the controller; and
a plurality of spring-loaded finger pedals positioned at a location relative to the plurality of touchless sensors, wherein a first finger pedal of the plurality of finger pedals is configured to be interpreted by the controller to define a first range of movement for an accelerator pedal, and wherein a second finger pedal of the plurality of finger pedals is configured to be interpreted by the controller to define a second range of movement for a brake pedal, wherein depressing the first finger pedal causes the controller to cause acceleration of the vehicle and depressing the second finger pedal causes the controller to cause braking of the vehicle based on the position of the driver's appendage in the range of movement, wherein the position of the driver's appendage within the range of movement controls at least one of a magnitude of acceleration and a magnitude of braking.

10. The touch free vehicle control system of claim 9, wherein the plurality of touchless sensors that comprises a plurality of cameras.

11. The touch free vehicle control system of claim 10, wherein the plurality of touchless sensors comprises a plurality of infrared sensors.

12. The touch free vehicle control system of claim 11, wherein the controller is configured to cause acceleration and braking of the vehicle based solely on the position of the at least one appendage in the range of movement.

13. The touch free vehicle control system of claim 12, wherein the gesture interface device further includes an enclosed well containing the plurality of touchless sensors and the first and second finger pedals, the enclosed well defining an aperture configured to allow the driver to place the driver's appendage within the enclosed well to access the first and second finger pedals to prevent accidental movement in the area of the plurality of touchless sensors.

14. The touch free vehicle control system of claim 12, wherein the gesture interface device further includes an enclosed well containing the plurality of touchless sensors, the enclosed well defining an aperture configured to allow the driver to place the driver's appendage within the enclosed well so that movement of the driver's appendage is detected by the plurality of touchless sensors and accidental movement in the range of movement is prevented.

15. The touch free vehicle control system of claim 12, wherein the different command signals generated from the controller include signals operating a vehicle function selected from the group consisting of:
acceleration, braking, parking brake on, parking brake release, door lock, door unlock, window actuators, door actuators, hood release switch, fuel door release switch, radio controls, telephone controls, navigation controls, interior light controls, exterior light controls, cruise controls, turn signal controls, hazard signal controls, odometer controls, vehicle information center controls, media player controls and window wiper controls and combinations thereof.

16. The touch free vehicle control system of claim 15, wherein the plurality of touchless sensors comprises at least one of a charge coupled device and a motion detector.

* * * * *